US006964745B1

(12) United States Patent
Brosse et al.

(10) Patent No.: US 6,964,745 B1
(45) Date of Patent: Nov. 15, 2005

(54) USE OF SUPERABSORBENT POLYMERS FOR TREATING RAW SKINS, CORRESPONDING COMPOSITIONS AND METHODS AND RESULTING TREATED SKINS

(75) Inventors: Jacques Brosse, La Grand Croix (FR); Bernard Sabatier, Saint-Etienne (FR)

(73) Assignee: SNF S.A., Saint-Eitenne (FR)

( * ) Notice: Subject to any disclaimer, the term of this patent is extended or adjusted under 35 U.S.C. 154(b) by 0 days.

(21) Appl. No.: 09/936,622

(22) PCT Filed: Mar. 6, 2000

(86) PCT No.: PCT/FR00/00553

§ 371 (c)(1),
(2), (4) Date: Jan. 4, 2002

(87) PCT Pub. No.: WO00/53816

PCT Pub. Date: Sep. 14, 2000

(30) Foreign Application Priority Data

Mar. 11, 1999 (FR) .............................. 99 03139

(51) Int. Cl.⁷ ................................................. C09K 3/00
(52) U.S. Cl. ....................... 252/380; 8/94.1 R; 8/94.15; 8/94.18
(58) Field of Search .......................... 252/380; 8/94.1 R, 8/94.15, 94.18

(56) References Cited

U.S. PATENT DOCUMENTS 4,732,968 A   3/1988 Obayashi et al.

4,914,066 A * 4/1990 Woodrum ................... 502/62

FOREIGN PATENT DOCUMENTS

| DE | 42 01 452 A1 | 7/1993 |
| EP | 90 40 2108 | 11/1990 |
| EP | 0 410 862 A1 | 1/1991 |
| RU | 432197 | * 6/1974 |
| RU | 432197 | 11/1974 |
| RU | 494409 | * 12/1975 |
| RU | 494409 | * 4/1978 |

OTHER PUBLICATIONS

Sweet, L et al, Controlling water activity for short-term preservation of fresh cattlehide for collagen and leather production JALCA, vol. 77, 1982.*

Chemical Abstracts, vol. 107, No. 20, dated Nov. 17, 1987, abstract No. 178578k.

* cited by examiner

Primary Examiner—Cephia D. Toomer
(74) Attorney, Agent, or Firm—Arent Fox, PLLC (57) ABSTRACT

The invention relates to use of superabsorbent (co)polymers (SAP) as an agent for preservation treatment of animal hides. The SAP is used preferably in conjunction with salt or other hygroscopic agent, in particular 50% NaCl/50% SAP by weight. Suitably treated hides are obtained in 24 hours and one-half less salt is used in comparison to the prior art, disadvantages such as surface brine, salt in slaughterhouse waste, and others being eliminated.

13 Claims, 3 Drawing Sheets

PROGRESS OF DEHYDRATION PLOTTED VERSUS TIME

◆ Tests 1-2-3-4    ■ Test 5-6-7    ▲ Test 8-9

Figure 1. PROGRESS OF DEHYDRATION PLOTTED VERSUS TIME

Figure 2. PROGRESS OF WEIGHT LOSS VERSUS TIME

Figure 3. PROGRESS OF MOISTURE AND SALT CONTENT

USE OF SUPERABSORBENT POLYMERS FOR TREATING RAW SKINS, CORRESPONDING COMPOSITIONS AND METHODS AND RESULTING TREATED SKINS

This invention relates to the technical sector of animal rawhide tanning.

Salt is currently used for preservation of hides. Hides are treated at the place in which they are obtained, in particular at the level of slaughterhouses for cattle, sheep, and the like, in order to ensure preservation of such hides, that is, to prevent putrefaction of the latter by bacterial action for a period of several weeks.

The object of preservation of fresh hides after slaughter and skinning of butchered animals is to prevent interaction of microorganisms and the hide.

Generally speaking, two methods may be employed to reach this objective:
- stabilization of the protein portion of the hide,
- complete destruction of bacterial flora.

Stabilization requires a certain preparation of the hide and results in a clearly characterized material; in addition, such conversion must be immediate. The current industrial context affords only little opportunity for general application of this system.

Total destruction of the flora requires employment of complete sterilization means accompanied by keeping the hide away from any source of contamination. This method seems unrealistic from both practical and economic viewpoints.

The methods of hide preservation currently employed are based on utilization of factors which retard or block development of microorganisms and the effect on the proteic substance.

These factors are temperature, hydration rate, and type and concentration of adjuvants.

Resort to dehydration remains the method most often utilized, while the processes most generally employed are salting and brining, and, to a lesser degree, drying. There are also methods which combine salting with drying, but their use is limited.

Salting consists of subjecting the fresh hide to the dehydrating action of common salt and brining to the action of a saturated saline solution.

If the moisture content of a fresh hide is around 70%, the extent of dehydration after salting and draining decreases by 15 to 20% and the residual impregnation moisture is saturated in salt.

Conditions unsuitable for bacterial development are thus created as s function of time, this ensuring preservation of the hide.

In the case of salting, after spending 10 to 15 days in a pile, the salted fresh hide may be conditioned and stored on suitable premises while awaiting shipping.

A salted fresh hide normally contains 15% for a moisture content of about 50% uniformly distributed over its thickness.

While they seem to be simple and effective, these methods lead to results the level of which is heavily influenced by the hide preparation conditions and the consideration of the treatment method applied.

Drying consists of causing the moisture naturally contained in a hide to evaporate to cause much more extensive drying than salting. Dried rawhides are much lighter than salted hides, in that their moisture content is only 10 to 15%. When stored on dry premises they may be preserved for a fairly long time if they have undergone insecticide treatment.

Unlike salting, drying, although it yields a stable product, remains restricted to areas in which climatic conditions permit its application naturally, where salt is rare and costly.

Drying is an operation delicate in execution during which a hide may undergo substantial degradation:
- if it dries too slowly, this results in putrefaction,
- if it dries too fast, this promotes alteration of the proteins of the hide.

Lastly, the dried hide is much more difficult to use in manufacture.

The practice of salting cattle hides is regulated by standard NF G53-002, "Rules for preserving cattle and equine rawhides by salting."

This standard specifies salting conditions, in particular the size of the salt crystals to be used on the basis of the skins to be salted:
- For thick skins an "all-purpose" salt whose crystals pass through mesh openings ranging in size from 1.25 mm to 3.15 mm,
- for calfskins preference is to be given to use of an "all-purpose" salt whose crystals pass through mesh openings ranging in size fm 0.4 mm to 1 mm.

Hides evenly covered with salt remain stacked for at least 15 days in order to promote flow of the pickling brine resulting from dehydration.

On the other hand, it has been established by experience that, in order to ensure good preservation of skins in all seasons, in summer in particular, 35 to 40 kg of salt must be used per 100 kg of fresh hides in the case of full grown cattle and 45 to 50 kg of salt in the case of calfskin.

The salt that is thus spread on a fresh hide is rapidly dissolved and settles on the surface, and beyond a slight depth of the subcutaneous tissue a concentrated saline solution of high osmotic pressure [is present].

The moisture which is present inside the hide is drawn outward, while the salt penetrates the interfibrillary liquid and reaches the interior of the collagen gel.

Partial dehydration of the hide takes place, in addition to absorption of salt by the latter.

The expert knows that salt (NaCl in the form of grains) performs the function of causing the moisture contained in the hide to flow out, probably by ionic action which expels the moisture contained in the collagen (principally), but also performs another entirely essential function, that of establishment of balance between protection against bacteria and the residual moisture which it is important to maintain in the hide.

One finds that total drying of the hide would result in serious disadvantages, such as uneven fading and the like and in alteration of pliability impairing marketing, and in attacks by insects.

This is why rehumidification of hides during a long operation is mandatory in the older processes in which total drying is accomplished by action of the sun.

Dehydration of the hide raw material obtained fresh after skinning of animals at the slaughterhouse and intended for the leather industry is one of the methods permitting preservation of the rawhide from slaughter to conversion to leather. The sodium chloride widely used for this purpose is, however, one of the major elements of saline pollution which the leather industry has the duty of reducing. Use of sodium chloride replacement products is part of the preventive strategy deriving from the desire to reduce the polluting charge of effluents generated during fresh hide conditioning operations, as well as that of waste water from the tanning and dressing industries.

The leather industry performs wet salting in order to preserve rawhides.

Partial dehydration of fresh hides:

reduces from 70 to 50% the amount of water contained in the hide (the moisture content drops from 70 to 50%)

ensures preservation of hides between slaughter and conversion to leather by dehydration and the presence of salt (15% of the hide by weight after dehydration).

However, the amounts of salt required present problems, particularly in regions in which water resources are limited. In addition, countries are more and more regulating these salinated wastes and, unless costly reverse osmosis techniques are used, the salinated effluents resulting from preservation cannot be recovered.

Future standards will be increasingly rigid and in effect will prohibit current treatment processes, unless costly additional salt recovery and similar steps are added to them.

It is estimated at the Leather Technical Center that only positive cold preservation techniques (from 2° C. to 5° C.) can replace salting. Chilled air treatment makes it possible to lower the temperature of hides to 5° C. in one hour, but requires conveyors to optimize heat exchange during chilling. The process, which is better suited for high outputs, allows preservation of hides for two weeks.

Dry ice (carbon dioxide ice) may also be used. It rapidly chills the surface and interior of a hide and eliminates the stages of rehumidification of hides and the water treatment inherent in use of water-based ice. This method, which has been studied in New Zealand, makes it possible to preserve small hides for a limited period of around 48 hours.

The principal stages of hide treatment are recapitulated below.

1. Preservation of the Raw Hide

Salt is used to collect moisture in order to improve preservation of a hide.

2. Stream Operation

The first stages of leather treatment are mostly mechanical:

1. washing (cleaning and softening)
  2. fleshing
  3. liming:

Treatment is carried out with lime+sodium sulfide+calcium carbonate to dissolve the roots of the hair. The calcium carbonate is used as thickener.

4. Lime pit:

Treatment is carried out in a lime pit to distend the fibers of the hide, this permitting better elimination of hairs and swelling of the hide (3–5 mm thickness), this resulting in "tripe hide").

5. Splitting: equalization of hide thickness (elimination of flesh side).

3. Tanning Operation

1. pickling: acidification in the presence of salt (pH 4.5) in a drum.

2. tanning: treatment with chrome salt to render the hide imputrescible and to impart good resistance to heat (100° C.).

A product designated as "wet blue" is thereby obtained.

3. Aging (holding for 24 hours)

4. Tint Retanning Operation

1. seasoning: mechanical
  2. grading (selection)
  3. shaving: reduction to definitive thickness
  4. tint retanning: in a cask in order to impart physical features and the basic tint. Use is made of synthetic resins, oils, fats, and dyes.
  5. drying: in a tunnel (70° C.)

A "crusted hide" is obtained.

5. Currying

1. rehumidification
  2. suppling (with stretching machine)
  3. framing: flattening hides by stretching (use of pincers).

5. Finishing

Use of a gun to apply solutions of dyes, resins (acrylic or polyurethane), binders, pigments, etc. Other mechanical operations: press shaping, smoothing, etc.

6. Finished Product Warehousing

Sorting by quality, measurement of surface area of each hide.

7. Laboratory Testing

1. testing raw materials (chemical products)
  2. testing of physical properties of finished leather.

Hence the problem presented was search for a new agent and/or a new process of preserving rawhides representing significant improvement over salt, particularly in environmental terms and those of compliance with future standards rejecting use of salt.

Many attempts have been made.

U.S. Pat. No. 4,902,298 proposes a highly complex composition of aluminum hydroxychloride, dicyandiamide-formaldehyde condensation products with free methylol groups, chromium sulfate, and polyacrylic acid. The presence of high proportions of metals such as chromium and aluminum is in conflict with development toward protection of the environment, which is the unmistakable current trend (cf "Leather Manufacture and Ecology," Anton Mayer, JALCA, Vol. 81, 1986).

Refer also to "Preservation and Tanning of Animal Hides," W. Marmer, Eastern Regional Research Center, Agricultural Research Service, US Department of Agriculture, Wyndmoor, Pa., USA, which states that the toxicity of chromium raises concern about all products containing chromium. The same article also cites the possibility of replacing NaCl with KCl because of the worry also created by sodium (page 63).

Combinations of salt and biocides or antiseptics or zinc chloride, formic acid, or N-methylolchloroacetamide have also been tried in some countries ("Short term preservation of hides in Zimbabwe," J. C. Barret, Jour. of Soc. of Leather Tech and Chem., Vol. 70, page 83). This document also indicates complex combinations of NaCl with specially inoculated copolymers of the specific hydrolyzed starch/polyacrylonitrile type and acetic acid, which according to this document are not cost effective in comparison to other options aimed at replacement of salt with less polluting agents. This document thus confirms the prejudice which has existed in connection with the prohibitive cost of any attempt at replacement of NaCl.

U.S. Pat. No. 4,834,763 makes use of combinations of chromium compounds and synthetic tanning agents such as formaldehyde condensation products, sulfonic acid derivatives, etc. (cf. col. 3).

R. G. H. Elliott (Jour. of the Soc. of Leather Tech. and Chem, Vol 67, page 31) draws up a list of known treatments, biocides, boric acid, salt-boric acid-naphthalene mixtures, antiseptics, bactericides, etc., and stresses the problems associated with disposal of such effluents, notably NaCl.

Aminated resins for leather have also been proposed (Jour. Soc. Leather Techn. and Chem., Vol. 63, p. 49, 2/79).

It has now been found that certain superabsorbent (co) polymers or SAP can replace salt for preservation of rawhides, under certain conditions.

In what follows the word "polymer" will be used to designate equally copolymers, terpolymers, etc. Similarly, the abbreviation SAP will also designate both superabsorbent polymers and copolymers, terpolymers, etc., and mixtures of such polymers.

The superabsorbents are polymers well known in precision chemistry; such polymers have been described in the following patents:

- U.S. Pat. No. 3,669,103: a slightly reticulated polymer such as poly-N-vinylpyrrolidone, polyvinyl toluene sulfonate, polysulfoethyl acrylate, poly-2-hydroxyethyl acrylate, polyvinylmethyloxazol-idinone, hydrolyzed polyacrylamide, polyacrylic acid, copolymers of acrylamide and acrylic acid, and alkaline metal salts of such polymers containing sulfonate or carboxy groups, especially partly hydrolyzed, slightly reticulated polyacrylamide.
- FR 2 559 158: reticulated polymers of acrylic or methacrylic acid, reticulated inoculated copolymers of the polysaccharide/acrylic or methacrylic acid type, reticulated terpolymers of the acrylic or methacrylic acid/acrylamide/sulfonated acrylamide type and their alkaline-earth or alkaline metal salts.

These polymers have as their principal characteristic a high ability to swell in an aqueous medium. They are used especially in agriculture for moisture retention in soils, in hygienic products for infants for urine absorption and similar applications.

It has surprisingly been found that such superabsorbents are capable both of absorbing moisture contained in a hide (something not apparent, since the polymer is applied on the surface) and of allowing appropriate residual humidity to subsist, something even less evident (as a matter of fact, in the prior art superabsorbents were studied for their ability to absorb the maximum amount of water, not merely a part of it).

Use of the superabsorbents claimed for the invention involves application of a new fresh skin treatment method which avoids, firstly, inside the slaughterhouse, formation of effluents charged with sodium chloride, by retention of effluents charged with sodium chloride, by moisture retention during dehydration operations and streaming of brine, and secondly inside tanneries-taweries, reduction of the pollutant charge of effluents generated by operations of rehydration of salted rawhides during their conversion to leather.

In addition, the applicant is also to be credited with having sought a solution to the problem in question by means of superabsorbents, while it is obvious that the cost of the polymers involved is far higher than that of salt, something which has naturally created a strong prejudice against use of such polymers in place of a basic product as inexpensive as salt. It is claimed, however, for the invention that it has been discovered that superabsorbent polymers permit significant reduction in the treatment time (by a factor or approximately 6), the result being largely restoration of the economic balance of treatment by polymer. In effect, hides can rotate about 6 times faster in slaughterhouses, with very significant gains in terms of investment profitability, reduction of stocks, and reduction of refrigeration capacity. In addition, superabsorbent polymers permit considerable reduction in the amount of streaming water or "rewiping water;" this represents even more significant advantages in terms of economy of treatment and investment, as well as in that of respect for the environment. Lastly, polymers allow treatment before shipping to the tannery with an amount of moisture less than the rawhide, this representing significant lowering of transportation costs. In fact, the treatment claimed for the invention with SAP polymers permits elimination of a large proportion of "dedicated" water in the SAP, through simple brushing of the swollen SAP before shipping to the tanneries. This leads to significant lowering of shipping costs, of the order of 15%.

In addition, the tanner and the slaughterhouses have less salt to discard, with a significant impact on the economics of treatment and, of course, the environment.

Hence it was found that use of superabsorbent polymers as claimed for the invention, in contrast to prior assumptions, corresponded to economically realistic treatment.

Above all, as has been indicated in the foregoing, the invention permits compliance with future standards by very sharply reducing the amount of salt to be used.

Such reduction is of the order of around 30 to 80%, as will be demonstrated by the following examples.

The superabsorbent polymers which may be used as claimed for the invention are all polymers of this type capable of absorbing the internal moisture of a rawhide when deposited on the surface of the hide, while allowing the internal moisture necessary for good preservation of the hide to remain.

Efforts will be made in particular to utilize superabsorbent polymers capable of allowing residual moisture ranging from 20 to 70% by weight, preferably of the order of 50% by weight, to remain in the hide.

The following monomers, given as non-restrictive examples, may be used in accordance with the invention to form appropriate superabsorbent polymers:

1. Monomers containing carboxyl groups: mono or polycarboxylic monoethylene-unsaturated acids such as (meth)acrylic acid (that is, acrylic acid or methacrylic acid, maleic acid, and fumaric acid).
2. Monomers containing groups of the carboxylic acid anhydride type: polycarboxylic anhydride acids with monoethylene unsaturation (such as maleic anhydride).
3. Monomers containing carboxylic acid salts: water-soluble salts (alkaline metal salts, ammonium salts, amine salts, etc.) of mono or polycarboxylic acids with monoethylene unsaturation (such as sodium (meth)acrylate, trimethylamine (meth)acrylate, trimethylamine (meth)acrylate, triethanolamine (meth)acrylate, sodium maleate, methylamine maleate).
4. Monomers containing sulfonic acid groups: aliphatic or aromatic vinylsulfonic acids (such as vinylsulfonic acid, allylsulfonic acid, vinyltoluene sulfonic acid, styrene sulfonic acid), (meth)acrylic sulfonic acids (such as sulfopropyl (meth)acrylate, 2-hydroxy-3-(meth)acryloxide sulfonic acid).
5. Monomers containing groups of sulfonic acid salts: alkaline metal salts, ammonium salts, monomer amine salts containing sulfonic acid groups as indicated above.

6. Monomers containing hydroxyl groups with monoethylene unsaturation (such as (meth)allyl alcohol), ethers or esters of polyols with monoethylene unsaturation (alkylene glycols, glycerol, polyoxyalkylene polyols such as hydroxyethyl (meth)acrylate, hydroxypropyl (meth)acrylate, triethylene glycol (meth)acrylate, ether of mono (meth)allyl of poly(oxyethylene oxypropylene) (in which the hydroxyl groups may be etherified or esterified).

7. Monomers containing amide groups: (meth) acrylamide, N-alkyl monoethylene (meth)acrylamides (such as N-methylacrylamide, N-hexylacrylamide), N,N-dialkyl (meth)acrylamides (such as N,N-dimethacrylamide, N,N-di-propylacrylamide), N-hydroxyalkyl (meth) acrylamides (such as N-methylol(meth)acrylamide, N-hydroxyethyl (meth) acrylamide, N,N-dihydroxyalkyl (meth)acrylamides (such as N,N-dihydroxyethyl (meth)acrylamide), vinyl lactams (such as N-vinylpyrrolidone).

8. Monomers containing amino groups: esters containing amino groups (such as esters of dialkylaminoalkyl, esters of dihydroxyalkylaminoalkyl, esters of morpholinoalkyl, etc.), mono or dicarboxylic acid with monoethylene unsaturation (such as dimethylaminoethyl (meth)acrylate, diethylaminoethyl (meth) acrylate, morpholinoethyl (meth)acrylate, dimethylaminoethyl fumarate, heterocyclic vinyl compounds (such as vinyl pyridines (for example, 2-vinyl pyridine, 4-vinyl pyridine, N-vinyl pyridine), N-vinyl imidazole.

9. Monomers containing groups of quaternary ammonium salts: salts of N,N,N-trialkyl-N-(meth) acryloyloxyalkylammonium (such as N,N,N-trimethyl-N-(meth)acryloyloxyethylammonium chloride, N,N,N-triethyl-N-(meth) acryloyloxyethylammonium chloride, trimethyl ammonium 2-hydroxy-3-(meth)-acryloyl-oxypropyl) chloride.

Preferably:

acrylamide, acrylic acid, methacrylic acid, sulfomethylated or chloromethylated dimethylaminoethyl acrylate, chloromethylated or sulfomethylated dimethyl aminoethyl-methacrylate.

The following are preferred superabsorbent polymers as claimed for the invention:

reticulated polyacrylamides, reticulated polyacrylates, reticulated acrylamide/acrylate copolymers sulfomethylated or chloromethylated acrylamide/dimethyl-aminoethylacrylate (ADAME) copolymers sulfomethylated or chloromethylate acrylamide/dimethyl-aminoethylmethacrylate (MADAME) copolymers.

Among the moisture absorbing resins which may be used as claimed for the invention mention may be made, for example, of reticulated polymers of acrylic acid or methacrylic acid, inoculated and reticulated copolymers of the polysaccharide/acrylic or methacrylic type, ternary reticulated acrylic or methacrylic/acrylamide sulfonated copolymers and their alkaline metal or alkaline earth salts, for example, products of reticulation of a homopolymer of acrylic acid or of a salt of this acid, of acrylic acid (or salt of acrylic acid)/methacrylic acid (or salt of methacrylic acid) and inoculated starch/acrylic acid (or salt of this acid) copolymers; hydrolyzates of inoculated reticulated polysaccharide/acrylonitrile copolymers, hydrolyzates of reticulated polysaccharide/acrylamide copolymers, for example, products of reticulation of hydrolyzed inoculated starch/ethyl acrylate copolymers, of hydrolyzed inoculated starch/methyl acrylate copolymers, of inoculated starch/hydrolyzed acrylonitrile copolymers, and of hydrolyzed inoculated starch/acrylamide copolymers; hydrolyzates of reticulated alkyl acrylate or methacrylate/vinyl acetate, for example, products of reticulation of hydrolyzed ethyl methacrylate/vinyl acetate copolymers and hydrolyzed methyl acrylate/vinyl acetate copolymers; hydrolyzates of inoculated reticulated starch/acrylonitrile/acrylamide/2-methylpropane sulfonic acid; hydrolyzates of inoculated reticulated starch/acrylonitrile/vinyl sulfonic acid copolymers; reticulated sodium carboxymethylcellulose and similar products. These products may be used either singly or mixed with each other.

Among the moisture-absorbent resin referred to above preference is given to reticulated polymers of acrylic or methacrylic acid and to inoculated reticulated polysaccharide/acrylic or methacrylic acid copolymers, ternary reticulated acrylic or methacrylic acid/acrylamide/sulfonated acrylamide copolymers.

Use may also be made of mixtures of superabsorbents, for example, ones of different grain sizes, or of different chemical composition, or of different grain size and chemical composition.

In particular, at least two SAP of different suitable grain sizes may be combined to obtain optimal coverage of the surface of a hide.

The expert will know how to select the best suited polymers or copolymers, as well as mixtures of these polymers or copolymers, on the basis of his own knowledge and optionally of routine tests and on that of the description and examples of this application.

It has also been found that it is essential not to use a superabsorbent singly but in combination with a hydrophilic or hygroscopic agent such as salt and a superabsorbent or mixture of superabsorbents.

One finds that a superabsorbent used singly exerts a pernicious effect, since a surface layer is formed which blocks the moisture near the surface of a hide. In addition, the layers deep in the thickness of the hide are too dry, this resulting in the serious disadvantages referred to earlier. Lastly, a boundary is formed between a very dry internal zone and a very humid surface zone, a boundary which represents an ideal environment for bacterial proliferation.

This adverse effect was relatively predictable, in the light of the known properties of superabsorbents, in particular their very great swelling power. It is probable that this factor also dissuaded the industry involved from investigating use of these products.

It is thus claimed for the invention that compounds are used which contain at least a mixture of:

at least one superabsorbent (co)polymer or SAP and at least one other hygroscopic agent optionally bactericides, biocides, antiseptics, preservation agents, and the like.

Mention is to be made as additional hygroscopic agents of:

salt $CaCl_2$, $MgCl_2$, KCl, and the like known to the expert.

The preferred hygroscopic agent is the salt NaCl.

The following may be cited as additives and bactericides, biocides, antiseptics, etc.:

products marketed under the brand names Phenonip (TM) and Acticide L.A. (TM), and other products known to the expert, as well as mixtures of such products.

The ratios of superabsorbent polymer (or copolymer, or mixture of several superabsorbent (co)polymers) to the other hydrophilic agent or agents range from 80 to 20, preferably 65 to 35, preferably around 50/50% by weight.

The best results have been obtained to date with a mixture of superabsorbent (SAP) and salt in ratios of around 50/50 in percent by weight.

A slightly swollen layer of SAP is formed, a layer which can be eliminated simply by brushing and which leaves a suitable moisture content in the hide.

It is to be noted that brushing forms gelatinous particles easy to collect and remove, in contrast to the running water resulting from conventional salt treatment. This is an essential advantage.

This yields another significant advantage, that is, the possibility of reusing the (SAP).

Use is to be made by preference of superabsorbent (co)polymers of a particle size smaller than around approximately 6 mm, preferably ranging from 0.3 to 4 mm, preferably from 0.5 to 3.15 mm. The particles should not be too voluminous, since they lead to local drying of the hide. In addition, too fine a grain size warps the surface of the flesh side of the hide and the effect is considerably reduced.

Grain sizes will also be sought which permit optimization of homogenization of the hygroscopic agent/SAP mixture.

In this instance as well the expert will be able to adapt the treatment mixtures on the basis of the hides and optionally routine tests. In particular, as was stated above, SAP mixtures having different grain sizes may be used especially by combining a fine grain size with a coarser grain size in order to produce optimum covering for the surface of a hide.

The mixtures or compositions claimed for the invention may incorporate various additives such as bactericides, preservation agents, and the like.

In particular, joint use of a bactericide makes it possible to reduce the proportion of salt in the mixture.

Other characteristics and advantages of the invention will be more clearly discerned by reading of the description and the examples, which are to be understood to be non-restrictive.

EXAMPLES

Initial data:
Weight of hide:
  Cowhide: 25 to 50 kg (70% water, 30% solids)
  Calfskin: 8 to 12 kg

Example 1

Use of Superabsorbent Alone

The superabsorbent polymer or SAP used is the product AQUASORB 3005 KL (tm) with grain size of 0.5 to 3.15 mm marketed by the applicant.

This is a copolymer of the acrylamide/reticulated acrylate type prepared by radical polymerization.
Preservation treatment:
  400 g AQUASORB(TM)/kg of hide After 24 h of contact with the superabsorbent applied on the flesh side, in an even layer, dehydration is irregular over the thickness of the skin, and vitrification of the external layers of the hide is observed.

The loss of weight found, 20%, corresponds to the desired dehydration effect, but the lack of uniformity over the thickness of the hide precludes use of the superabsorbent alone.

Example 2

Use of a Mixture of Sodium Chloride and Superabsorbent

The superabsorbent selected is AQUASORB 3005 KL (TM), which permits production of a 50/50 mixture with sodium chloride (grain sizes used: 1.25 mm to 3.15 mm for adult hides, 0.4 mm to 1 mm for calfskins).
Preservative treatment:
  200 g AQUASORB (TM)/kg of hide
  200 g salt/kg of hide It has been found that the salt is fixed in the hide, and so no salt is to be found in the waste for the slaughterhouses.

The hide loses 20% of its weight after 24 h; hence a hide ready for the tanner is obtained.

The amount of mixture 50/50 by weight used to achieve uniform coverage of the hide is 400 g mixture/kg of fresh hide (in the case of NaCl alone, the amount used is 400 g NaCl/kg fresh hide).

In this example the presence of salt permits dehydration without a "surface effect."

Use of the 50/50 mixture based on 400 g/kg fresh hide results in the following dehydrated hide:
  15 to 20% salt content
  moisture content reduced from 70 to 50%.
Findings Fresh hide treated in accordance with the invention, in particular with the 50/50 NaCl and AQUASORB 3005 KL (TM), is found to be in the state customarily encountered under current industrial conditions (use of NaCl alone).

This state is observed after only 24 h of contact, without streaming of the brine, in contrast to the 15 days of "stacking" required in the prior art to be eliminated by draining 20% of the moisture (relative to the initial weight of the hide) charged with salt (this representing more than 50% of the salt used: 200 to 250 g/kg of hide).

Preservation (stabilization of bacteria) is ensured by sufficient dehydration and presence of salt.

Hides treated in this way may undergo the rehydration operations normally because of the presence of salt under the hide.

The superabsorbent and the moisture must be removed from the surface of the hides and should not accompany the hides to the tanner, but this step is easily accomplished simply by brushing.

The following tests have also been conducted:
Preamble to Experiments

The dehydration tests with cowhide involving use of superabsorbents are conducted on the basis of fresh calfskin of a mean fresh weight of 25 kg originating with the leather marketing company of Lyon and its surrounding area (69 Corbas).

A. Moisture Content of Fresh Hide

The degree of hydration of the hides used was calculated on the basis of 3 samples of fresh hide, oven dried 24 hours at 105° C. (Table 1).

The moisture content of the hides ranges from 65 to 70%.

The spread of values found is justified by the greater or lesser abundance of hair on the samples taken.

B. Absorbent Products Tested

Three superabsorbent products were tested as fresh hide dehydration agents: they will be designated by reference letters as products A, B, C.
  Product A: AQUASORB 3005 KM,
  Product B: AQUASORB 3005 KL
  Product C: PR3005 A, marketed by the applicant, SNF SA.
Granulometric characteristics:
- Product A: fine grain
- Product B: medium grain
- Product C: coarse grain.

C. Experimental Conditions

The surfaces of the hides treated were cut from whole fresh calfskins.

The samples measure 50×50 cm in area.

The absorbent products used in specific amounts (relative to the weight of the skin treated were spread in an even layer either on a stainless steel base for contact of the flesh with the dehydrating product or directly on the flesh side by sprinkling.

The samples treated in this manner were left at rest at ambient temperature for the duration of the test and were protected by plastic film from evaporation.

Evolution of Dehydration Over Time

A. Choice of Superabsorbent

The three products A, B, C were tested.

A superabsorbent weight identical to the weight of the fresh hide corresponds to each hide sample.

First series of tests: The superabsorbent was spread in an even layer over the stainless steel base and over a surface of 50×50 cm, the hide samples being in contact with the absorbent product on the flesh side (the hair side of the hide being visible)

Second series of tests: The hide sample was in contact with the stainless steel base on the hair side, the superabsorbent then being sprinkled in a uniform layer on the flesh side.

The hide samples remained in contact for 24 hours in both series of tests.

The results (Table 2) show that for each superabsorbent grain size the weight loss of fresh hide ranges from 24.24 to 27.54%, or, for a fresh hide initially with moisture content of 67.5%, the moisture content ranges from 40 to 43% water.

The moisture content of fresh hide dehydrated in this manner would be lower than that generally found after salting and storage under industrial conditions.

COMMENTS: No matter which absorbent was used (product A, B, or C), dehydration was not uniform over the thickness of the hide. Vitrification is to be observed on the flesh side of the hide, as a result of the very high absorbent power used under the conditions specified in both series of tests referred to above.

This very pronounced dehydrating effect entails excessive rigidity of the hide which complicates handling during folding before storage.

The results of these two test series reveal no significant difference in the amount of moisture absorbed by the different products A, B, C or in the position of the superabsorbent (hide positioned above or below the superabsorbent: 24.53 to 27.54% in the first case as against 24.24 to 27.54% in the second). Even if displacement of the moisture should be higher as a result of drainage, when the hide is positioned with the flesh side on the superabsorbent, after 24 hours of contact this effect entails no significant variation in loss of moisture from the skin, in view of the dispersion of the calculated values of moisture loss, absorption of moisture by the individual superabsorbents being stabilized over a period of 24 hours. In both series of tests, the blockage effect found due to excessive dehydration of the external layer of hide results in equilibrium.

This very advanced dehydration of the flesh side, which for one thing blocks the displacement of moisture toward the superabsorbent, would be bad for uniform recovery of moisture from the hide during the first rehydration operations performed during the operations of converting the hide to leather.

During the handling operations, especially at the time of separation of the superabsorbents for the purpose of weighing the dehydrated hide,
- product A (fine grains) is the most difficult to eliminate by sweeping, its grain size imparting to it too much the characteristic of a gel.
- in the case of products B and C (average-sized to large grains), the absence of "glue" makes it possible to separate the absorbent product from the skin before the second weighing.

The average-sized grain (product B, Aquasorb 3005 KL) was approved because its behavior in handling operations and its grain size, near that of the salt used, permitted mixing of the two products (superabsorbent and sodium chloride) before application to the hide.

On the other hand, use of different amounts of Aquasorb 3005 KL for complete coverage by sprinkling of the surface the fresh hide to be dehydrated results in retention of an amount of superabsorbent of 400 g per kg of fresh hide.

We find that:
- below 400 g/kg, coverage of the hide is not uniform,
- above this amount the dose of superabsorbent applied would be superfluous.

During the following tests study was devoted consecutively to:
- evolution of dehydration over time,
- use of the superabsorbent and sodium chloride mixture.

In all cases the superabsorbent or the superabsorbent/sodium chloride mixture was applied by sprinkling to the flesh side of the hide; this restored the salting operating conditions.

B. Use of Superabsorbent Alone

Once application by sprinkling the flesh side of the fresh hide at the rate of 400 g/kg of fresh skin had been adopted and Aquasorb 3005 KL had been selected, a series of tests was conducted to monitor dehydration over time.

Table 3 presents the results of the test conducted:
- with a single sample of hide weighed after 24, 48, 72, and 96 hours. Before each weighing the hide was freed of the superabsorbent, which was set aside during the weighing, and sprinkled again for an additional contact period of 24 hours.

In order also to monitor the loss of moisture caused by the handling operations and evaporation during such operations, two other series of tests were conducted in parallel for which the hide samples were weighed only after 48 and 72 hours respectively, then every 24 hours until completion of 96 hours of contact.

The dehydration was monitored throughout the period of contact in each series of tests.

Figure 1:
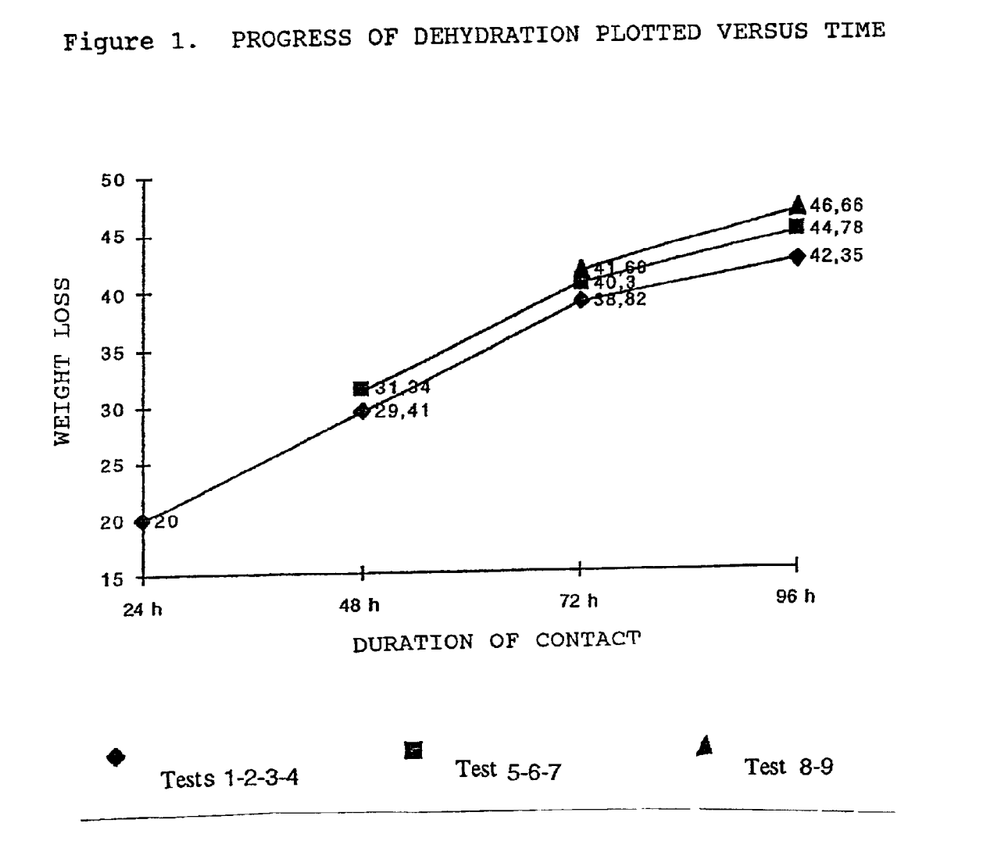
FIG. 1: Progress of Dehydration Plotted versus Time
Figure 2:
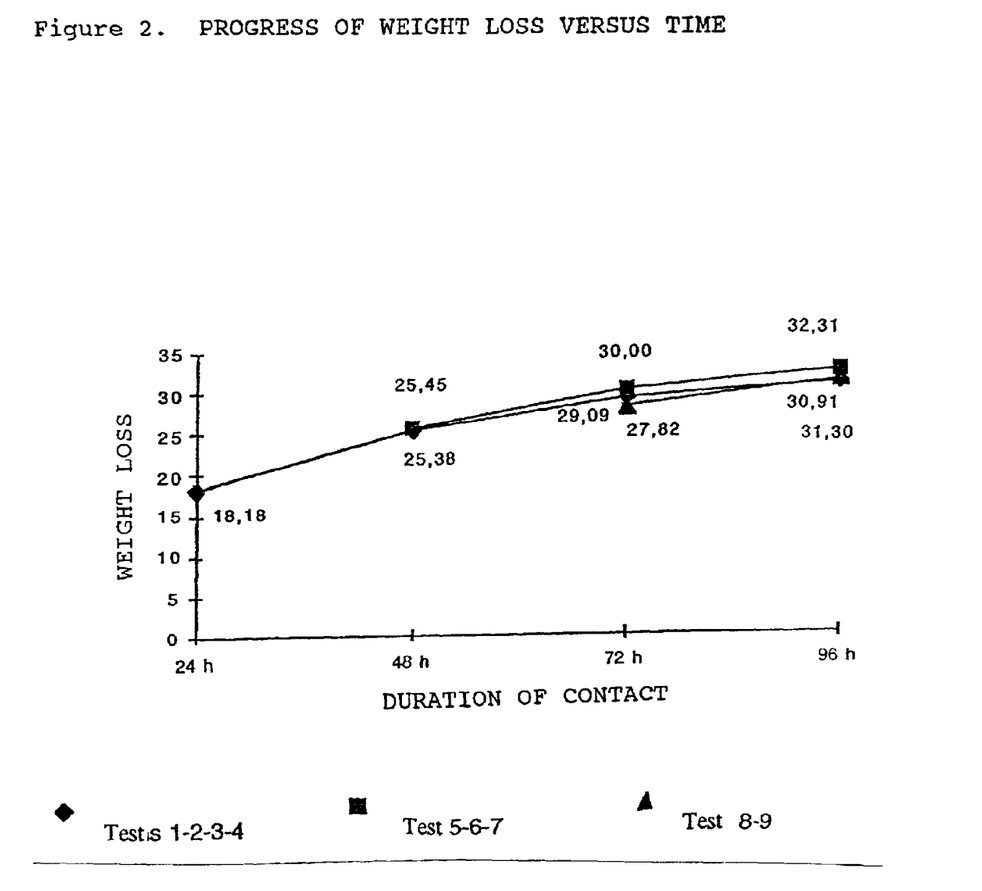
FIG. 2: Progress of Weight Loss versus Time
Figure 3:
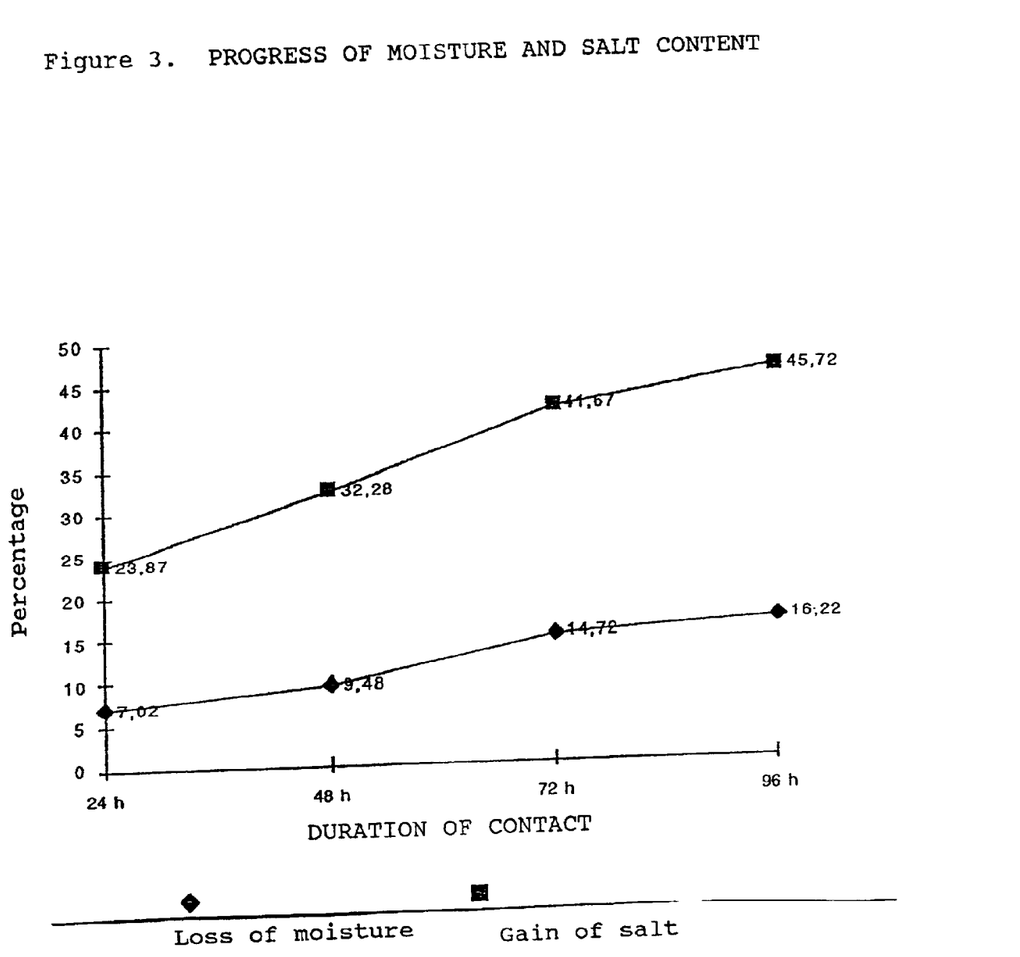
FIG. 3: Progress of Moisture and Salt Content

The results are presented in FIGS. 1, 2, and 3 attached,

Tests 1, 2, 3, and 4 were carried out with the first sample of hide of known initial weight and were weighed again after 24, 48, 72, and 96 hours of contact with Aquasorb 3005 KL and after sweeping.

Tests 5, 6, and 7 were carried out with the second hide sample of known initial weight and were weighed again after 48, 72, and 96 hours of contact with Aquasorb 3005 KL and after sweeping.

Tests 8 and 9 were carried out with the third hide sample of known initial weight and were weighed again after 72 and 96 hours of contact with Aquasorb 3005 KL and after sweeping.

An additional loss reaching 2.5% was actually found when a sample was weighed after an identical period of contact but without intermediate sweeping and re-sprinkling.

The moisture loss, 24.70% after 24 hours of contact obtained with 400 g of superabsorbent per kg of fresh hide, is smaller than that initially determined (25.37/26.98) by using a weight of superabsorbent identical to that of the fresh hide sample. In addition, when 400 g/kg were used the massive effect of dehydration of the outer layers of hide was not as pronounced as when a larger amount of superabsorbent was used.

Conversion of the fresh hide to a preserved state, that is, reduction of its moisture content by 25%, required only 24 hours, in contrast to the 10 to 15 days required in the case of salting alone.

In order to limit the moisture loss of the hide during the first 24 hours, the addition of sodium chloride to the superabsorbent was then tested.

C. Utilization of Aquasorb 3005 KL/Sodium Chloride Mixture

The purpose of this test was to observe the progress of fresh skin dehydration over time by using equal amounts of Aquasorb 3005 KL and sodium chloride making a total of 400 g/kg fresh hide.

The results of the tests, presented in Table 4, permit monitoring of the weight loss of the hide during dehydration.

The weight loss of the swept sample does not represent the moisture loss of the hide directly, but rather the resultant of dehydration of the hide and absorption of the salt of the latter.

The variation in the moisture content of the hide during dehydration and the gain in the salt content of the latter are presented analogously in Table 5

Findings

Generally speaking, the three Aquasorb (TM) products may be used to advantage to replace sodium chloride for dehydration of fresh cowhide.

For practical reasons selection of the three products tested is based on the grain size which promotes uniform coverage of the flesh side of the hide and removal of the product by sweeping. The grain size of Aquasorb 3005 Kl, 0.5–3.15, is of the same order of magnitude as that of the sodium chloride, 0.4–3.15, used in industrial practice.

Use of an Aquasorb 3005 KL/sodium chloride mixture avoids the overly rapid dehydration observed when superabsorbent alone is used.

The amount of Aquasorb 3005 KL/sodium chloride mixture is based on the amount of product required for uniform coverage of the flesh side of the hide: 400 g/kg of fresh adult cowhide. The 50/50 mixture may be modified in order to adjust the percentage of residual moisture of the dehydrated hide, as well as the salt content of the same hide.

If the sodium chloride is customarily used for its low cost and its "antiseptic power" in the concentrations present in a hide, other additives to the superabsorbent may be considered:

hygroscopic products limiting dehydration of the fresh hide, bactericides to protect the dehydrated hide during storage.

The constant objective was to reduce the moisture content of the fresh hide by 20% and to prevent any development of bacteria during storage before conversion to leather.

The tests were conducted as indicated initially, with samples taken from skins of 25-kg calves. The results of these tests are appropriate for this category of hide. Since the hides are marketed by weight category (one batch of hides being characterized by the average weight of the hides: the band), the results may vary from one category to another, within the limits of the weight/hide surface ratios. Generally speaking, the figures relating to dehydration of the hides are known averages based on observations made with different bands; only in this case may a confidence interval be associated with the stated values.

TABLE 1

MOISTURE CONTENT OF CALFSKINS calculated by mesurement of the loss of weight of a sample of fresh calfskin kept in an oven 24 hours at a temperature of 105° C..
average moisture content: 67.54%.

TABLE 2

BEHAVIOR OF SUPERABSORBENTS TOWARD FRESH HIDE

The moisture loss of a fresh cowhide was calculated after measurement of the weight loss of fresh hide which had been in contact with the superabsorbent for 24 hours.
First test series A superabsorbent weight equalling the weight of the 50 × 50 cm hide sample taken was spread in a uniform layer on a stainless steel base. The hide was placed in contact with the superabsorbent on the flesh side.
Second test series The 50 × 50 cm samples of fresh hide were placed on the stainless steel base with the hair side in contact; the absorbent product, of a weight equaling that of the fresh hide sample, was sprinkled on the flesh side of the hide.

TABLE 3

PROGRESS OF DEHYDRATION OVER TIME WITH SUPER-ABSORBENT ONLY USED

A. Use of the same fresh hide sample to monitor the progress of dehydration over time after sweeping and reuse of the superabsorbent, on the basis of 400 g/kg of fresh hide.
B. Use of two other samples of fresh hide to carry out the second weighings only 48 to 72 hours after commencement of the test, thereby preventing losses due to handling and evaporation.

TABLE 4

PROGRESS OVER TIME OF LOSS OF WEIGHT OF A HIDE BY USING THE SUPERABSORBENT/SODIUM CHLORIDE MIXTURE

A. Use of the same sample of fresh hide to observe the progress of the dehydration over time after sweeping and reuse of the absorbent mixture, on the basis of 400 g/kg of fresh hide (200 g Aquasorb 3005 KL/200 g NaCl).
B. Use of two other samples of fresh hide to carry out the second weighings only 48 to 72 hours after commencement of the test, thereby preventing losses due to handling and evaporation.

TABLE 5

PROGRESS OVER TIME OF:

THE MOISTURE CONTENT OF THE HIDE DURING DEHYDRATION
THE AMOUNT OF SALT IN THE HIDE,

TABLE 5-continued

PROGRESS OVER TIME OF:

THE SUPERABSORBENT/SODIUM CHLORIDE MIXTURE BEING USED
Use of the same sample of fresh hide to observe the progress of dehydration over time after sweeping and reuse of the superabsorbent/sodium chloride mixture, on the basis of 400 g/kg of fresh hide.
After each period of contact a 5 × 5 cm sample was taken and oven dried at 105° C. for 24 hours.
The salt gain was determined at the same time. After dehydration of the sample used for determination of the moisture content, the sample was calcined in order to determine the sodium chloride content.

The invention also relates to compositions for preservative treatment of raw animal hides as specified in the claims, characterized in that such compositions contain the following superabsorbents and hygroscopic agents:

NaCl+SAP 1
(Reticulated polyacrylate; grain size 0.5–3 mm) or
SAP 2
(Reticulated polyacrylate; grain size 100–800 microns) or
SAP 1+SAP 2
(Reticulated polyacrylate+reticulated acrylamide/ acrylate copolymer, grain size 0.1 to 3 mm) or
SAP 3
(Acrylamide copolymer, reticulated chloromethylated MADAME, grain size 0.5–3 mm), or
SAP 4
(Acrylamide copolymer, reticulated, chloromethylated ADAME, grain size 0.5–3 mm)

compounds for preservative treatment of raw animal hides as specified in the claims, characterized in that such compounds contain the following agents:

SAP Aquasorb 3005 KL (TM) reticulated acrylamide/ acrylate
200 g/kg of hide
NaCl 200 g/kg of hide a process for preservative treatment of raw animal hides, characterized in that such process comprises at least one step of placing a hide in contact with a preservative compound as described above.

a process for preservative treatment of animal rawhides, characterized in that the contact takes place during approximately 24 h.

animal hides, wherein such hides are treated for preservation with a compound as described above, use of superabsorbent polymer(s) SAP for preservation of animal hides.

use of superabsorbent polymer(s) SAP and one or more hygroscopic agent(s) for preservation of animal hides.

TABLE 1

| TESTS | 1 | 2 | 3 |
|---|---|---|---|
| Test sample, g | 56.15 | 49.60 | 51.65 |
| M.S., g | 16.88 | 17.20 | 16.86 |
| Moisture loss, g | 39.27 | 32.40 | 34.79 |
| Moisture loss, % | 69.94 | 65.32 | 67.36 |

M.S. = dry matter

TABLE 2

| PRODUCT | A | A | B | B | C | C |
|---|---|---|---|---|---|---|
| GRAIN SIZE | FINE | FINE | MEDIUM | MEDIUM | COARSE | COARSE |
| Fresh hide, g | 1200 | 1060 | 1340 | 1260 | 1700 | 1380 |
| Absorbent, g | 1200 | 1060 | 1340 | 1260 | 1700 | 1380 |
| Hide weight after 24 h | 900 | 820 | 1000 | 920 | 1260 | 1000 |
| Weight loss, g | 300 | 260 | 340 | 340 | 440 | 380 |
| WEIGHT LOSS, % | 25.00 | 24.53 | 25.37 | 26.98 | 25.88 | 27.54 |
| PRODUCT | A | A | B | B | C | C |
| GRAIN SIZE | FINE | FINE | MEDIUM | MEDIUM | COARSE | COARSE |
| Free hide, g | 1380 | 1640 | 1320 | 1520 | 970 | 1560 |
| Absorbent, g | 1380 | 1640 | 1320 | 1520 | 970 | 1560 |
| Hide weight after 24 h | 1020 | 1300 | 1020 | 1140 | 750 | 1180 |
| Weight loss, g | 280 | 420 | 320 | 380 | 240 | 380 |
| WEIGHT LOSS, % | 27.54 | 25.61 | 24.24 | 25.00 | 24.74 | 24.36 |

TABLE 3

| TEST NO. | 1 | 2 | 3 | 4 | 5 |
|---|---|---|---|---|---|
| CONTACT TIME | 24 hours | 48 hours | 72 hours | 96 hours | 48 h |
| FRESH HIDE WEIGHT | 1700 | 1700 | 1700 | 1700 | 1340 |
| ABSORBENT WEIGHT | 680 | 680 | 680 | 680 | 536 |
| HIDE WEIGHT AFTER CONTACT OF | 1360 | 1200 | 1040 | 980 | 920 |
| MOISTURE LOSS | 420 | 500 | 660 | 720 | 420 |
| % MOISTURE LOSS | 24.70 | 29.41 | 38.82 | 42.35 | 31.34 |
| TEST NO. | 6 | 7 | 8 | 9 | |
| CONTACT TIME | 72 h | 96 h | 72 h | 96 h | |
| FRESH HIDE WEIGHT | 1340 | 1340 | 1200 | 1200 | |
| ABSORBENT WEIGHT | 536 | 536 | 480 | 480 | |
| HIDE WEIGHT AFTER CONTACT OF | 800 | 740 | 700 | 640 | |
| MOISTURE LOSS | 540 | 600 | 500 | 560 | |
| % MOISTURE LOSS | 40.30 | 44.78 | 41.66 | 46.66 | |

TABLE 4

| TEST NO. | 1 | 2 | 3 | 4 | 5 |
|---|---|---|---|---|---|
| CONTACT TIME | 24 hours | 48 hours | 72 hours | 96 hours | 48 h |
| FRESH HIDE WEIGHT | 3300 | 3300 | 3300 | 3300 | 2600 |

TABLE 4-continued

| | | | | | |
|---|---|---|---|---|---|
| HIDE WEIGHT AFTER SWEEPING CONTACT | 2700 | 2460 | 2340 | 2280 | 1940 |
| WEIGHT LOSS, g | 600 | 840 | 960 | 1020 | 660 |
| WEIGHT LOSS, % | 18.18 | 25.45 | 29.09 | 30.91 | 25.38 |
| TEST NO. | 6 | 7 | 8 | 9 | |
| CONTACT TIME | 72 h | 96 h | 72 h | 96 h | |
| FRESH HIDE WEIGHT | 2600 | 2600 | 2300 | 2300 | |
| HIDE WEIGHT AFTER SWEEPING CONTACT | 1820 | 1760 | 1660 | 1580 | |
| WEIGHT LOSS, g | 780 | 840 | 640 | 720 | |
| WEIGHT LOSS, % | 30.00 | 32.31 | 27.82 | 31.30 | |

TABLE 5

| TEST NO. | 1 | 2 | 3 | 4 |
|---|---|---|---|---|
| CONTACT TIME | 24 hours | 45 hours | 72 hours | 96 hours |
| FRESH HIDE WEIGHT | 3300 | 3300 | 3300 | 3300 |
| AQUASORB WEIGHT | 660 | 660 | 660 | 660 |
| NaCl WEIGHT | 660 | 660 | 660 | 660 |
| MOISTURE CONTACT OF HIDE after contact, % | 46.13 | 37.72 | 28.43 | 24.28 |
| NaCl GAIN OF HIDE, % | 7.62 | 9.46 | 14.72 | 16.22 |
| WEIGHT LOSS OF HIDE, % | 18.18 | 25.45 | 30.91 | 29.09 |

What is claimed is:

1. Compositions in particle form for preservative treatment of raw animal hides, comprising a mixture of:
   at least one superabsorbent (co)polymer that absorbs the internal moisture of rawhide when deposited on the surface of a fresh rawhide during a dehydrating process, while allowing internal moisture necessary for good preservation of the hide to remain, and
   at least one other hydrophilic agent, and
   at least one bactericide and/or preservative agent,
   wherein the superabsorbent polymers is at least one superabsorbent polymer selected from the group consisting of: crosslinked acrylamide, acrylamide (co)polymers, crosslinked (meth)acrylate (co)polymers, sulfomethylated (co)polymers, chloromethylated (co)polymers, dimethylaminoethyl (co)polymers, and (meth)acrylate (co)polymers.

2. The compositions of claim 1, wherein the superabsorbent (co)polymer absorbs allows a residual moisture ranging from 20 to 70%, preferably 50%, by weight based on the weight of water-containing hide to remain in the hide.

3. The compositions of claim 1, wherein the superabsorbent (co)polymer absorbs allows a residual moisture of about 50% by weight based on the weight of water-containing hide to remain in the hide.

4. The compositions of claim 1, wherein the at least one other hydrophilic agent is one or more of NaCl, $CaCl_2$, $MgCl_2$ and/or KCl.

5. Compositions for preservative treatment of raw animal hides as specified in claim 1, wherein the ratios of the superabsorbent polymer and the at least one other hydrophilic agent is from 80 to 20% by weight.

6. Compositions for preservative treatment of raw animal hides as specified in claim 1, wherein the ratios of the superabsorbent polymer to the at least one other hydrophilic agent is from 65 to 35% by weight.

7. Compositions for preservative treatment of raw animal hides as specified in claim 1, wherein the ratios of the superabsorbent polymer to the at least one other hydrophilic agent is around 50/50% by weight.

8. Compositions for preservative treatment of raw animal hides as specified in claim 1, wherein the superabsorbent polymers have a grain size smaller than approximately 6 mm.

9. Compositions for preservative treatment of raw animal hides as specified in claim 1, wherein the superabsorbent polymers have a particle size ranging from 0.5 to 3 mm.

10. Compositions for preservative treatment of raw animal hides as specified in claim 1, wherein the superabsorbent polymers have a grain size around 0.3 to 1 mm.

11. Compositions for preservative treatment of raw animal hides as specified in claim 1, wherein such compositions contain the following agents: reticulated acrylamide/acrylate
   200 g/kg hide of superabsorbent, referring to the amount of reticulated acrylamide/acrylate,
   200 g/kg hide of NaCl.

12. A process for preservative treatment of raw animal hides as specified in claim 1, wherein such contact is continued for a period of around 24 h.

13. Animal hides, characterized in that such hides have been treated for preservation with a composition as specified in claim 1.

* * * * *